United States Patent Office 3,155,732
Patented Nov. 3, 1964

3,155,732
PROCESS FOR THE PRODUCTION OF TETRA-ALKYL DIBORANES
Konrad Lang and Friedrich Schubert, Leverkusen, Germany, assignors to Farbenfabriken Bayer Aktiengesellschaft, Leverkusen, Germany, a corporation of Germany
No Drawing. Filed July 22, 1959, Ser. No. 828,706
Claims priority, application Germany July 24, 1958
5 Claims. (Cl. 260—606.5)

The present invention relates to an improved process for the production of derivatives of borohydrides wherein a part of the hydrogen atoms are replaced by alkyl-, cycloalkyl- or aryl groups. These compounds correspond to the general formula $(R_nBH_{3-n})_m$, wherein R stands for an aliphatic, cycloaliphatic or aromatic hydrocarbon radical, $n$ is 1 or 2 and $m$ is 1 or 2.

Borohydrides alkylated at the boron atom are high-energy propellants. Four processes are described in the literature for producing alkylated borohydrides.

(1) Reaction of diborane with boron alkyls, at room temperature for 12 hours.
(2) Hydrogenation of boron alkyls with hydrogen.
(3) Reaction of sodium borohydride with vinyl bromide or allyl bromide in tetraethylene glycol dimethyl ether.
(4) Reaction of boron hydrides with sodium alkyl.

These processes show a number of disadvantages. Thus, method (1) requires operating with diborane which is extremely poisonous, highly volatile and explosive; moreover, the reaction times are too long for a technical application. Process (2) offers the possibility of a technical operation, but in this instance a boron alkyl has to be initially produced in which alkyl groups have again to be substituted by hydrogen. The yield referred to alkyl is thus substantially reduced. According to (3) there have to be used alkylene bromides and tetraethylene glycol dimethyl ethers both difficult to obtain. In process (4) boron hydrides and sodium alkyls are used which are likewise difficult to handle.

In accordance with the present invention it has been found that the afore-defined boronhydrides are obtained by reacting a boron hydrocarbon compound selected from the group consisting of boron trialkyls, boron tricycloalkyls and boron triaryls with a metal borohydride selected from the group consisting of alkali metal and alkaline-earth metal borohydrides, and with a boron-trihalide compound selected from the group consisting of boronhalides and addition products of boronhalides to aliphatic and cycloaliphatic ethers.

The process of the invention proceeds according to the following equations:

(a) $3pMBH_4 + 4pBF_3 + 4(6-p)BR_3 \rightarrow 12B_2H_pR_{6-p} + 3pMBF_4$
  $M = Na, K;\ R = alkyl\text{-},\ aryl\text{-},\ cycloalkyl\text{-radical};\ p$ is an integer from 2–5

(b) $3pMBH_4 + pBX_3 + 4(6-p)BR_3 \rightarrow 12B_2H_pR_{6-p} + 3pMX$
  $M = Na, K, Li;\ X = Cl, Br, I;\ M = Li, X = F$ (c) $3/2pM(BH_4)_2 + pBX_3 + 4(6-p)BR_3 \rightarrow 12B_2H_pR_{6-p} + 3/2MX_2$
  $M = Ca, Mg, Sr, Ba;\ X = F, Cl, Br, I$ The aforesaid general equations are further illustrated by way of example wherein tetrapropyl diborane is produced from boron tripropyl, sodium borohydride and boron trifluoride-tetrahydrofuranate: $M = Na,\ p = 2$ $3NaBH_4 + 4BF_3 \cdot OC_4H_8 + 8B(C_3H_7)_3 = 6B_2H_2(C_3H_7)_4 + 3NaBF_4 + 4C_4H_8O$ or by way of example wherein diphenyl borane is produced:

$3NaBH_4 + 4BF_3 \cdot OC_4H_8 + 8B(C_6H_5)_3 \rightarrow 12(C_6H_5)_2BH + 3NaBF_4 + 4C_4H_8O$ Borohydrocarbons which are suitable according to the invention in the production of alkylated and arylated boranes are e.g. boron trimethyl, boron triethyl, boron tripropyl, boron tricyclohexyl, boron triphenyl, boron tritoluyl, boron tris-(ethylphenyl).

As boronhalides there may be used boron trifluoride and boron trichloride, besides boron tribromide and boron triiodide. Instead of the free boronhalides, the addition products thereof to aliphatic and cycloaliphatic ethers, e.g. dimethyl-ether, diethylether, tetrahydrofurane, diethylene-glycol-dimethyl-ether may be used.

It is advantageous to use solvents, however, the process of the invention can also be accomplished in the absence of solvents. Solvents which are particularly suitable for the process of the invention are tetrahydrofurane and diethylene glycol dimethyl ether.

As reaction reaction temperature there are preferably used slightly elevated temperatures (30–60° C.) but to complete the reaction, the reaction mixture may additionally be boiled under reflux. After filtering and driving off the solvent, the crude alkyl or aryl borane mixture remains and is purified by fractional distillation from secondary products the high and low molecular weight alkyl or aryl boranes formed by disproportionation.

No difficulty is encountered in carrying out the reaction which has to be conducted in a nitrogen or argon atmosphere because of the sensitivity to oxygen of the reaction partners. The reaction between the boron carbon compound and the boron hydride $BH_3$ acting in statu nascendi, proceeds very rapidly under the given conditions so that, in spite of the very low solubility of diborane in the ethers preferably used as solvents, practically no boron hydride escapes from the reaction mixture.

This is surprising since it is known that, on the one hand, alkali metal borohydrides, for example, react with borontrihalides in ethers practically quantitatively and very rapidly with the formation of diborane $B_2H_6$ and, on the other hand, boron alkyls react only slowly with diborane as has been mentioned, above. It was, therefore, to be expected that the bulk of the reaction of borohydride-boronhalide and boron alkyl would lead to the formation of diborane and not, as is actually the case, to a practically quantitative formation of alkyl diboranes, resp. arylboranes.

The process involves a technical advance since, on the one hand, technically readily obtainable and inexpensive starting materials are used such as sodium borohydride, boron alkyls and boron halides, and the hydrogen used in the form of borohydride as well as the alkyl available in the boron alkyl compounds and, when using boron chloride or boron bromide, the total quantity of boron introduced into the reaction being completely consumed in one step for the formation of the desired alkyl diborane or arylborane. Another essential advantage of the process consists in that the starting materials are compounds comparatively easy to handle of low toxicity so that the reactions may be conducted in an inert atmosphere without any further precautions. In contrast, the use of the extraordinarily toxic and explosive diborane which reacts moreover, comparatively slowly, necessitates extensive precautionary measures thus rendering a technical application of the processes in question very difficult.

*Example 1*

In a round-bottom flask provided with reflux condenser, dropping funnel, agitator and immersion thermometer a suspension of 64 g. of sodium borohydride, and 560 g.

of boron tripropyl in 0.75 litre of tetrahydrofurane is treated in a nitrogen atmosphere with vigorous stirring in the course of 1½ hours with 280 g. of boron trifluoride diethyl etherate. The internal temperature is not allowed to exceed 50° C. The mixture is then refluxed in a water bath for 2 hours and then the solvent is distilled off. The residue is distilled at 46–50° C./3 mm. Hg and tetrapropyl diborane is obtained in 90% yield in the form of a colourless liquid reacting vigorously with water, acids and caustics with evolution of hydrogen, and the composition of which was established by volumetric determination of the hydrogen formed in the hydrolysis and by acidimetric determination of the boron content after decomposition with sodium peroxide. The propyl diboranes formed in addition to tetrapropyl diborane were obtained from the distilled solvent by reaction with triethyl amine in the form of N-triethyl borazanes. N-triethyl-B-propyl borazane, $(C_2H_5)_3N.BH_2(C_3H_7)$, was chiefly formed.

*Example 2*

In a round-bottom flask provided with a reflux condenser, dropping funnel, agitator and immersed thermometer a suspension of 65 grams of boron trifluoride-tetrahydrofurane is slowly added dropwise with vigorous stirring to a suspension of 20 grams of sodium borohydride 195 grams of triphenylborane in 2 litres of tetrahydrofuran. The internal temperature is not allowed to exceed 40° C. The mixture is then heated to the boil under reflux for 3 hours, allowed to cool, filtered and the tetrahydrofurane is distilled off from the filtrate. The residue is purified by distillation in vacuum or by sublimation. The diphenyl borane is obtained in solid form of the melting point 180° C.

We claim:
1. Process for the production of tetraalkyl diborane which comprises reacting:
   (a) a boron trialkyl,
   (b) an alkali metal borohydride, and
   (c) a member selected from the group consisting of boron trifluoride, addition products of boron trifluoride with alkyl ethers, addition products of boron trifluoride with tetrahydrofuran, and mixtures thereof in an inert solvent selected from the group consisting of tetrahydrofuran and diethylene glycol dimethyl ether at about normal pressure and a temperature between about 30–60° C.

2. Process according to claim 1 which includes completing the reaction by boiling under reflux.

3. Process according to claim 1 in which (b) is sodium borohydride.

4. Process according to claim 1 in which (a) is boron tripropyl.

5. Process according to claim 4 in which (b) is sodium borohydride.

References Cited in the file of this patent
UNITED STATES PATENTS
2,855,440     Walters et al. _____ Oct. 7, 1958

OTHER REFERENCES
Schlesinger et al.: Chem. Reviews, vol. 31, pp. 13–14 (1942).